Aug. 11, 1964  F. H. TENNIS  3,143,894
OPERATING LEVER FOR HYDRAULIC CONTROL VALVE
Filed July 17, 1962  3 Sheets-Sheet 2
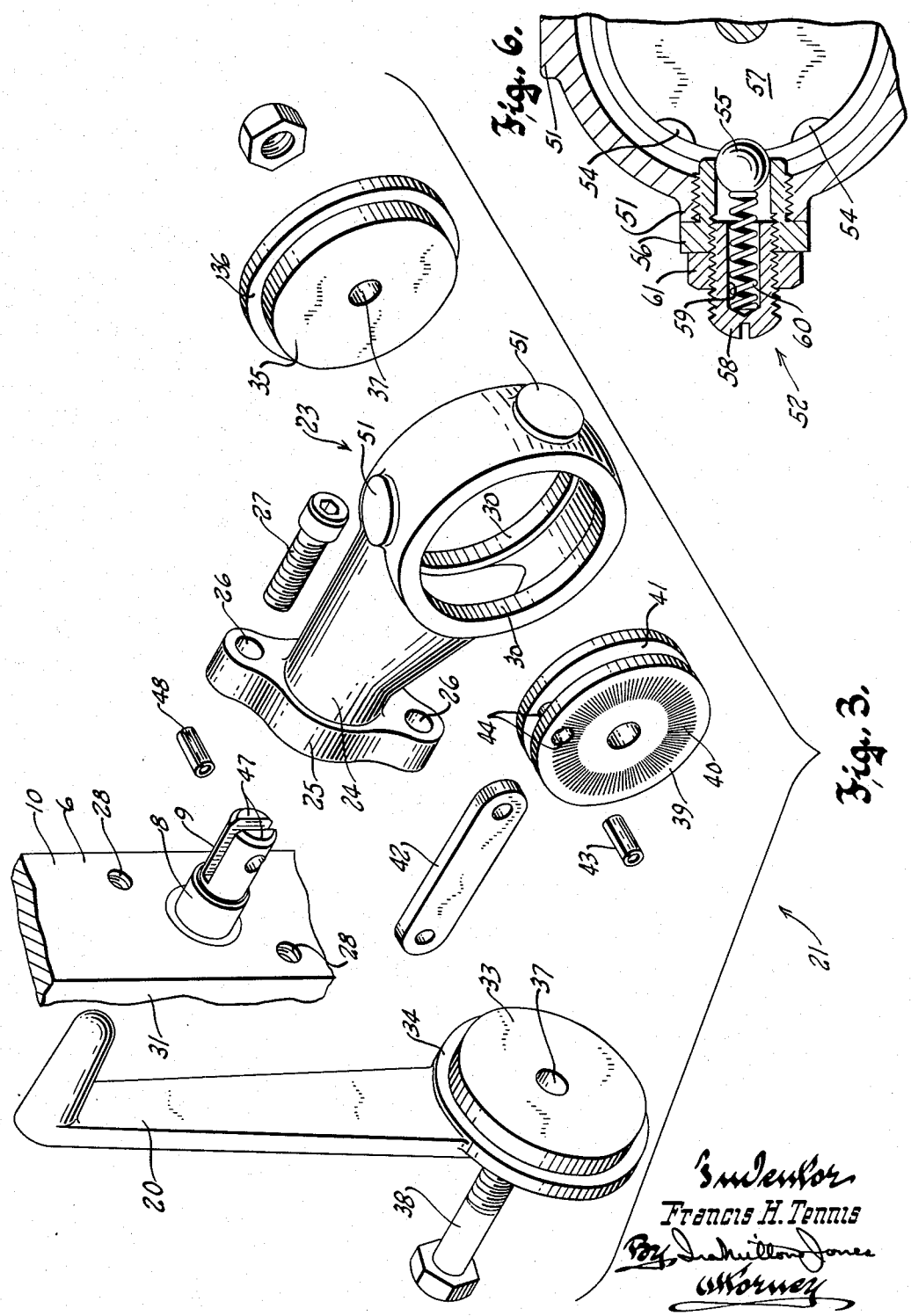

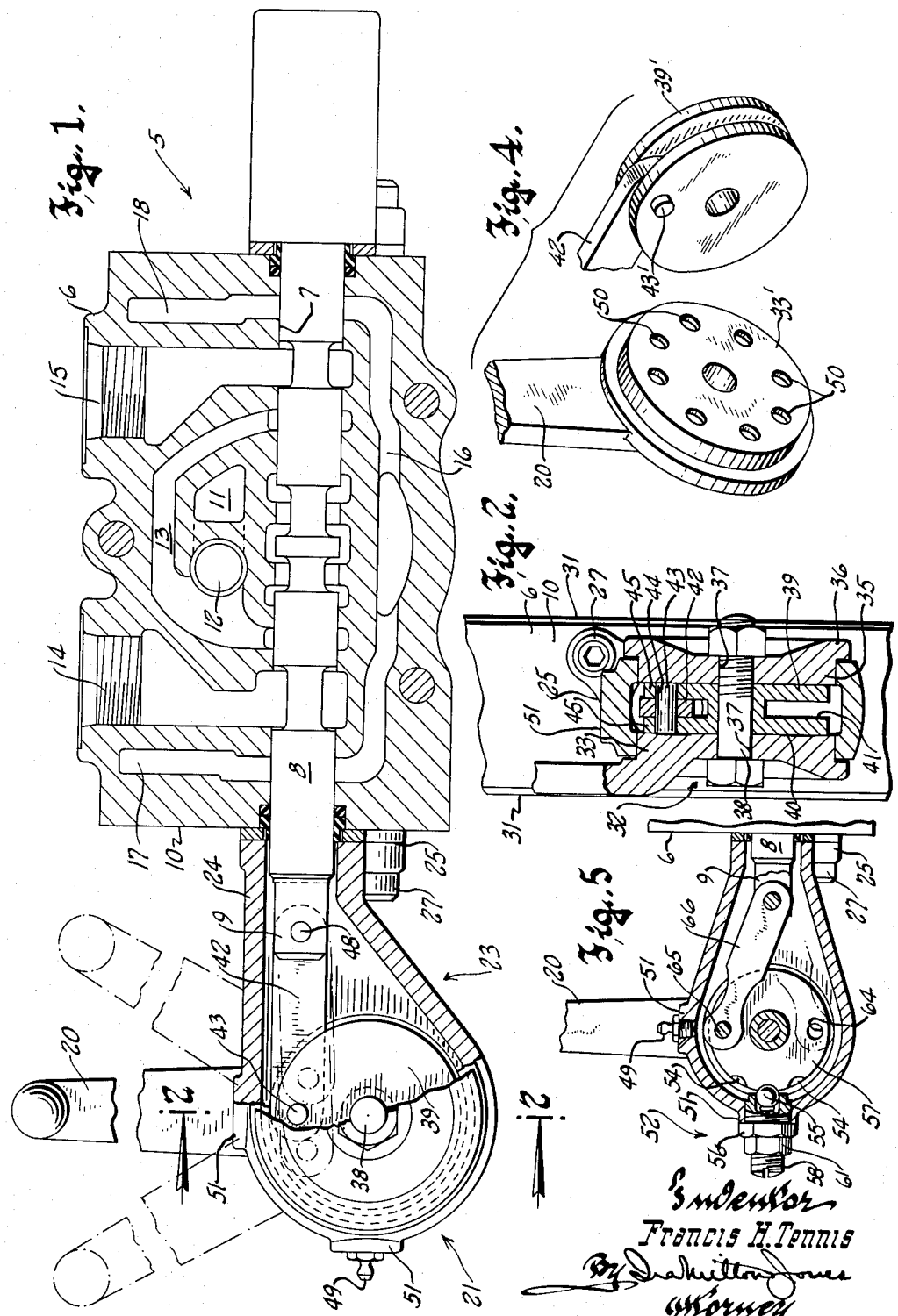

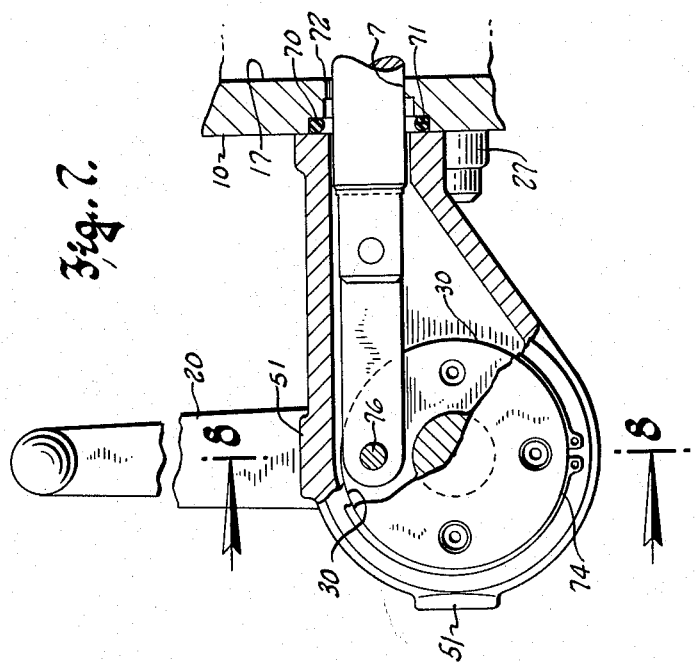
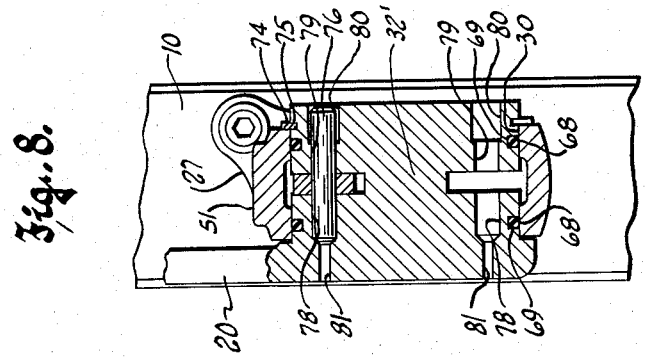

United States Patent Office 3,143,894
Patented Aug. 11, 1964

3,143,894
OPERATING LEVER FOR HYDRAULIC
CONTROL VALVE
Francis H. Tennis, Milwaukee, Wis., assignor to Hydraulic Unit Specialties Company, Pewaukee, Wis., a corporation of Wisconsin
Filed July 17, 1962, Ser. No. 210,315
3 Claims. (Cl. 74—105)

This invention relates generally to control valves for fluid pressure operated systems, and has more particular reference to control valves of the type comprising a body and one or more valve elements in the body, each actuatable by means of an operating lever, to and from a plurality of control positions to govern the operation of a hydraulic cylinder or the like.

Ordinarily, the operating levers for the valve elements of such control valves are pivotally supported from the body of the control valve at one side thereof, and one end portion of each valve element projects to the exterior of the valve body for direct connection to its operating lever.

The main purpose of this invention is to provide an improved operating lever assembly for the valve elements or spools of hydraulic control valves of the character described.

More specifically, it is the purpose of this invention to provide an operating lever assembly, for a control valve of the character described, which assembly comprises a lever, a mounting bracket which is readily attachable to the body of a control valve and has the lever pivotally mounted thereon, and which bracket affords a housing that is adapted to receive and enclose the projecting end of a valve element or spool with which the lever is connectable so as to protect the spool from contamination by dirt and other foreign matter.

Another purpose of this invention resides in the provision of an operating lever assembly of the character described wherein the means that provides for drivingly connecting the lever with a valve element or spool also provides for a wide range of adjustment of the angle of the lever with respect to the valve element, and in addition enables the direction in which the valve element is driven to be reversed without necessarily changing the angle of the lever relative to the housing of the assembly.

Another object of this invention resides in the provision of an operating lever assembly for control valves of the character described which not only keeps the projecting end portion of the valve element clean but which also provides a housing that can be filled either with grease or oil from a low pressure passage of the control valve, to exclude undesirable fluids and dirt and to provide lubrication for the motion transmitting means that connects the lever with the valve element.

Still another object of this invention resides in the provision of an operating lever assembly for control valves of the character described, comprising a housing which is attachable to the side of the control valve, an operating lever pivoted on the housing for actuating a valve element of the control valve, and a link to connect the lever with the valve element, and wherein all of the parts of the driving connection between the lever and the valve element are enclosed within the housing.

A further object of this invention resides in the provision of an operating lever assembly of the character described, wherein a hub on the operating lever is journalled in the housing of the assembly, and cooperating detent means carried by the housing and the hub are provided to define the different control positions of a valve element connected with the lever.

Another object of the invention resides in the provision of an improved operating lever assembly which, by reason of its compactness, is particularly well suited for close stacking when used on control valves of sectional construction.

With these and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several examples of the physical embodiments of the invention constructed according to the best modes so far devised for the practical application of the principles thereof, and in which:

FIGURE 1 is a sectional view of a hydraulic control valve having the operating lever assembly of this invention attached thereto;

FIGURE 2 is a sectional view taken through FIGURE 1 along the plane of the line 2—2;

FIGURE 3 is a separated perspective view of the components which comprise the operating lever assembly of this invention;

FIGURE 4 is a separated perspective view of a slightly modified embodiment of the invention;

FIGURE 5 is a sectional veiw showing still another modified embodiment of the invention;

FIGURE 6 is an enlarged fragmentary view of the detent mechanism shown in the FIGURE 5 embodiment of the invention;

FIGURE 7 is a fragmentary view similar to FIGURE 1, but illustrating a further modification of the invention; and FIGURE 8 is a sectional view taken through FIGURE 7 on the plane of line 8—8.

Referring now to the accompanying drawings wherein like reference characters have been applied to like parts throughout the views, the numeral 5 generally designates one spool section of a hydraulic control valve, the section comprising a body 6 having a bore 7 therein, and an elongated valve element or spool 8 which is endwise slidably received in the bore and has an end portion 9 projecting from one side 10 of the body so as to be accessible for actuation. The sectional control valve 5 may be of any conventional construction, but has here been illustrated as of the type disclosed in my co-pending application Serial No. 192,220, filed May 3, 1962, to which reference may be had for a more complete description of the valve and its operation.

Those familiar with hydraulic control valves will recognize that the valve 5 is of the open center type, and that its valve element or spool 8 is shown in a neutral or hold position. The spool may be shifted in opposite directions from neutral to either of two control or operating positions at each of which it effects flow of pressure fluid through a feeder passage 11, past a check valve 12, and into a branched passage 13. The spool directs pressure fluid in the branched passage 13 to either of a pair of service passages 14 and 15, and diverts fluid returning to the other service passage into an exhaust passage 16 which has branches 17 and 18 that are respectively adjacent to the service passages 14 and 15.

Back and forth endwise sliding motion is imparted to the valve element or spool 8 by a hand lever 20 which forms a part of the operating lever assembly 21 of this invention, and which assembly is attached to the side 10 of the valve body from which the valve spool 8 projects.

In addition to the lever 20, the assembly 21 comprises a bracket 23 that provides a housing having a tubular front portion 24 extending toward the side 10 of the control valve body and terminating in an attaching flange 25. Opposite ears on the flange 25 have holes 26 therein to receive screws 27, which thread into apertures 28 in the side 10 of the valve body to secure the assembly thereto with the tubular portion of the housing in register with the bore 7 of the valve body.

Whereas in the past the projecting end 9 of the valve element was left exposed at the exterior of the control valve body, it here projects through the opening in the flanged end of the housing 23 and into the interior of its tubular front portion 24, to be entirely concealed thereby, and thus protected against the weather and from contamination by dirt and other foreign matter.

As seen best in FIGURE 3, the rear of the housing is enlarged and provided with relatively large diameter coaxial holes 30 in its opposite sides. The holes 30, which may be of equal diameter as shown, are disposed with their axis normal to that of the tubular front portion 24 of the housing and to the opposite faces 31 of the control valve section to which it is attached, so as to be at right angles to the axis of the valve spool 8. The holes, which give the rear portion of the housing 23 a substantially ring-like appearance provide axially spaced bearings in which a hub 32 on the lower extremity of the hand lever 20 is rotatably received so as to constrain the lever to swinging or back and forth rocking motion about an axis crosswise of that of the control spool 8.

For convenience of assembly, the hub 32 of the lever is comprised of a plurality of members or components. One of the hub members 33 is fixed to and forms a part of the operating lever 20. It projects inwardly from a larger diameter lower end portion 34 of the lever to enter and loosely rotatably fit in the bearing hole 30 in one side of the housing. Another one of the hub members 35 projects from a larger diameter disc 36 and similarly enters and loosely rotatably fits into the other bearing hole 30 at the opposite side of the housing. The two hub members 33 and 35 thus cooperate to close the large openings 30 in the opposite sides of the housing, and they are provided with central coaxial holes 37 to receive a bolt 38 by which the hub members are held assembled with the lever and with the housing 23.

The bolt 38 also passes centrally through a third hub member or driving disc 39 to clamp the same between the hub members 33 and 35 tightly enough to provide a frictional driving connection between the lever 20 and the adjacent face of the driving disc. Knurling 40 on the face of the disc that opposes the hub member 33 assures good frictional driving engagement between the disc and the lever.

As seen best in FIGURE 2, the driving disc is provided with a deep circumferential slot or groove 41 in its periphery, in which the rear end portion of a drive link 42 is received. A pivot pin 43 passing through coaxial holes 44 in the flanges 45 at the opposite sides of the circumferential groove in the disc and through the rear end portion of the link eccentrically drivingly connects the latter with the disc, and thus with the lever 20.

The driving disc 39, being confined between the two hub members 33 and 35, acts as a spacer therebetween, and serves to prevent the larger diameter portions 34 and 36 thereof from being clamped against the opposite sides of the housing. This assures substantially free rotation of the hub of the operating lever 20 in the bearings provided by the holes 30.

The opposite end portion of the drive link 42 extends forwardly into the tubular neck portion 24 of the housing and is received between bifurcations 47 on the projecting end portion 9 of the valve element 8, to which it is drivingly connected by a pivot pin 48.

Attention is directed to the fact that the tubular front portion 24 of the housing 23 projects substantially straight outwardly from the side 10 of the valve body to which the operating lever assembly is attached, while the larger rear portion of the housing is offset downwardly away from the axis of the valve spool a distance to enable the drive link 42 to be lengthwise aligned with the valve spool, and have its pivot pin 43 more or less directly above the axis of the operating lever hub in the neutral position of the valve spool 8 at which the operating lever projects vertically from the housing. Referring to FIGURE 1, it will be seen that the operating lever 20 may be swung either toward or from the adjacent side 10 of the valve body to shift the valve spool 8 toward the two control positions thereof described earlier. This disposition of the link 42 relative to the drive disc and the valve spool is capable of producing maximum travel of the link in consequence of rotation of the disc, and minimum pivotal motion of the link about the pin 48 connecting it with the valve spool.

One of the outstanding features of the operating lever assembly described is achieved by reason of the frictional driving connection which the lever 20 has with the drive disc 39. The bolt 38 which maintains this frictional connection operative, enables the operating lever 20 to be adjusted to and clamped in any desired angular position relative to the driving disc 39, throughout a range of over 180°. Moreover, such angular adjustment of the operating lever may be made without in anywise disturbing the attitude of the drive link, which may remain substantially in endwise alignment with the valve element or spool 8 of the control valve.

This is advantageous in that it enables the control valve to be mounted in a variety of different positions and still have the operating lever disposed vertically or in the most desirable attitude for easy actuation.

Further, by way of example, the operating lever may be adjusted to a position 180° opposite that shown in FIGURE 1 to effect reversal of the motion that it imparts to the valve spool 8. This may be highly advantageous in instances where some operators of hydraulic apparatus governed by the control valve may prefer response of a component of the apparatus in consequence of actuation of the operating lever in one certain direction, while others prefer such response in consequence of actuation of the lever in the opposite direction.

Still another outstanding advantage of the operating lever assembly described is that its housing and lever may be made with very narrow dimensions so as to be applicable to hydraulic control valves of sectional construction where close stacking of the valve sections is imperative. FIGURE 2 illustrates this desirable attribute of the lever assembly of this invention, wherein it will be noted that no portion of the housing 23, or of the lever 20 and its hub project beyond the opposite faces 31 of the valve section.

While the housing 23 of the operating lever assembly completely encloses the projecting end portion 9 of the valve element or spool 8 to thus protect it from contamination by dust and dirt, this invention affords another advantage in that it enables the interior of the housing to be packed with grease if desired to positively prevent foreign matter from entering the housing and coming into contact with the projecting end portion 9 of the control spool. This may be highy advantageous wherever hydraulically operated apparatus controlled by a valve such as described must be used outdoors during the winter months, when ice might form on the exposed portions of the valve. This, of course, could seriously affect the operation of the control valve if its spool were not enclosed by a housing such as forms part of the operating lever assembly of this invention.

For the above purpose, a grease fitting 49 may be screwed into a tapped hole through a boss or pad 51 formed on the rim of the housing, as seen best in FIGURE 1.

FIGURE 4 discloses a slightly modified embodiment of the invention wherein a positive but adjustable driving connection is provided between the hub member 33' on the lower end of the operating lever 20 and the drive disc 39'. For that purpose, the hub member 33' is provided with a number of holes 50 arranged on a circle that is concentric to the hub axis, and which open to the inner face thereof, toward the adjacent face of the driving disc 39'. The pivot pin 43' in this case, projects into one of the holes 50 to drivingly connect the link 42 with the operating lever. Consequently, the construction illustrated in FIGURE 4 retains substantially the same advantage of adjustability of the operating lever relative to the driving disc except that the lever is at all times positively drivingly connected with the disc and friction is not relied upon to transmit swinging movement of the lever into back and forth motion of the control spool 8.

FIGURE 5 illustrates the ease with which detent means 52 may be built into the operating lever assembly of this invention, to arrest swinging motion of the operating lever 20 at the different control positions of the valve element or spool 8, and thus define said positions thereof. This detent mechanism, of course, is readily applicable to either of the two embodiments of the invention previously described and for that purpose a second boss or pad 51 is formed on the rim of the housing 23, at a location spaced circumferentially from the pad that mounts the grease fitting.

The detent mechanism comprises suitably located detent notches or depressions 54 in the periphery of the hub 32 on the operating lever, and a housing carried member such as a ball 55 which is projectible into any of the notches under spring bias as the notches are brought into register with the ball. As shown best in FIGURE 6, the detent pad 51 is drilled and tapped to receive a bushing 56, the hollow inner end portion of which projects into the housing and terminates in close proximity to the periphery of the driving disc 57. The inner end portion of the bushing loosely receives the detent ball 55.

A spring retaining and adjusting screw 58 is threaded into the outer end of the bushing and has a deep well 59 opening to the interior of the bushing to receive a coiled compression spring 60 which is confined under compression between the bottom of the well 59 and the detent ball to urge the latter against the periphery of the drive disc 57. A lock nut 61 threaded over the exterior of the retaining screw 58 maintains the same in any desired position of adjustment, and when loosened, permits the force of the detent spring 60 to be adjusted to any desired value.

Since in the construction described, the detent ball 55 registers with the groove between the flanges on the drive disc, the detent notches are preferably formed in both flanges of the disc, as opposite pairs of notches in the inner corners of the flanges.

The embodiment of the invention illustrated in FIGURE 5 also differs from those previously described in that the housing of the lever assembly is formed to locate the axis of the lever hub in such a way that it is intersected by the axis of the tubular front portion 24 of the housing. In addition, it is shown provided with diametrically opposite holes 64 in its drive disc to enable the pivot pin 65 in the rear of the drive link 66 to connect the link to the disc at either side of the axis of the lever hub. Thus, if the link were connected to the drive disc below the hub axis, it would cause the hand lever 20 to drive the valve spool in the opposite direction.

FIGURES 7 and 8 illustrate how the components of the motion transmitting connection between the lever and the valve element can be supplied with lubricant from the adjacent branch 17 of the exhaust passage in the control valve. As therein seen, the hub 32' of the operating lever 20 is made in one piece and integral with the lever to facilitate sealing the housing against loss of hydraulic fluid therefrom.

Hence, O-rings 68 in each bearing hole 30 of the housing, are confined in circumferential grooves 69 in the cylindrical end portions of the hub 32'. A similar O-ring 70 seated in a counterbore 71 in the side 10 of the valve body, at the mouth of the bore 7, bears against the attaching flange 27 on the housing.

The conventional seal around the adjacent end portion of the valve spool may be eliminated, and if desired the bore 7 inwardly of the counterbore 71 may be slightly enlarged to enable oil to flow into the interior of the housing 23 from the passage 17. In this instance, however, a small diameter passageway 72 leading outwardly from the passage 17 in the valve body to the counterbore 71 has been shown in FIGURE 7 as comprising the means for introducing oil into the interior of the housing 23.

As seen best in FIGURE 8, the hub 32' of the operating lever 20 is held assembled with the housing by means of a split ring 74. The inner edge portion of the ring is confined in a circumferential groove 75 in the hub portion remote from the lever, and its peripheral portion overlies the adjacent side of the housing.

Also in this case, a longer pin 76 is used to eccentrically connect the link 77 with the hub 32'. The pin 76 preferably passes loosely through the rear portion of the link and has a close, liquid tight fit in registering holes 78 and 79 of equal diameter in the hub at opposite sides of the link. The hole 79 opens to the end of the hub remote from the lever 20 through a counterbore 80 that is only slightly larger in diameter than the hole 79, while the hole 78 opens to the opposite end of the hub through a smaller diameter hole 81 in which a tool may be inserted to enable the pin to be driven out of the hub. This, of course, facilitates reconnection of the link to the hub after adjustment of the angle of the lever 20 relative to the housing, for which purpose a number of additional sets of pin receiving holes are provided in the hub. In use, of course, the additional sets of holes are suitably plugged to prevent loss of hydraulic fluid from the housing.

From the foregoing description, taken together with the accompanying drawings, it will be readily apparent to those skilled in the art that this invention provides a vastly improved operating lever assembly for hydraulic control valves, which not only completely and protectively encloses the projecting end portion of the valve spool with which it is operatively associated, but which provides for an exceptionally wide range of adjustment of the position of the operating lever relative to the spool of the control valve, and features such a degree of compactness as to enable close stacking of the sections of a sectional control valve having operating lever assemblies of this invention mounted thereon.

What is claimed as my invention is:

1. Actuating means for shifting the valve spool of a hydraulic control valve endwise in opposite directions from a predetermined neutral position of the spool, comprising:
(A) a housing having a substantially tubular forward portion that defines a forwardly facing opening at the front of the housing, which opening is adapted to receive an end portion of the valve spool of a hydraulic control valve, and having a rear portion which has holes opening to opposite sides thereof and disposed on a common transverse axis;
(B) means on the front of the housing providing for attachment thereof to the body of a hydraulic control valve;
(C) an operating lever having an end portion disposed wholly to one side of the housing at its rear;
(D) means on said end portion of the operating lever defining a hub which serves to mount the lever on the housing for back and forth rocking motion about an axis fixed with respect to the housing, said hub extending laterally from said portion of the lever through said holes and continuously across the interior of the housing, and comprising
(1) a plurality of axially contiguous hub members that are relatively movable axially and rotatively, (2) hub retaining means on the axially endmost hub members overlying the opposite sides of the housing to normally prevent axial displacement of the hub from the housing, said hub members serving as spacer means to prevent binding engagement between the hub retaining means and the sides of the housing, (3) cylindrical bearing means on said hub members rotatably journalled in said holes to support the lever for rocking motion about their common axis, (4) and a single screw threaded fastening element, coaxially of the hub, to detachably maintain the hub in place on the lever and against axial displacement from the housing, said fastening element releasably holding the hub members against relative axial movement out of contiguous relation;

(E) a link in the housing having a front portion extending forwardly toward said opening and adapted for connection to an end portion of the valve spool of a hydraulic control valve, and having its rear end connected eccentrically to one of said hub members at a location thereon such that the rear of the link is carried either forwardly or rearwardly of the hub axis to move the link lengthwise in opposite directions from a normal position in consequence of rotary movement of said one hub member in opposite directions;

(F) and drive means on said hub members drivingly connecting said link connected hub member with the lever with the latter in any one of a number of different angular positions of adjustment relative to the link connected hub member, said drive means being maintained operative as long as said hub members are held in axially contiguous relation but being rendered inoperative in consequence of the axial separation of the hub members permitted when the single fastening element is loosened, to enable rotational adjustment of the lever relative to the link connected hub member without removal of the hub from the housing and without disturbing the connection between the link and its hub member or the eccentricity of said connection relative to the hub axis.

2. Actuating means for shifting the valve spool of a hydraulic control valve endwise in opposite directions from a neutral position of the valve spool, comprising:

(A) a housing having a tubular forward portion which at the front of the housing defines a forwardly facing opening to receive an end portion of the valve spool of a hydraulic control valve, said housing having a rear portion with holes opening to its opposite sides and disposed on a common transverse axis;

(B) attaching means on the front of the housing providing for securement thereof to the body of a control valve;

(C) a link in the housing having its rear end adjacent to the axis of said holes, and extending lengthwise forwardly toward said opening for connection to an end portion of the valve spool of a control valve;

(D) means defining a hub that extends through said holes and continuously across the rear of the housing, said hub comprising (1) a plurality of axially contiguous hub members that are relatively movable both axially and rotatively, (2) a single detachable screw threaded fastening element in the hub, coaxially thereof, to hold the hub members against separation out of axially contiguous relation, (3) cylindrical bearing means on the axially remote hub members rotatably journalled in said holes to support the hub for rotation on the common axis thereof, (4) and flange means on said axially remote hub members held by the fastening element and the spacing action of the axially contiguous hub members in positions loosely overlying the opposite sides of the housing so as to prevent displacement of the hub from the housing except upon detachment of said fastening element, said flange means constraining the axially outermost hub members to assembly and dissassembly from opposite sides of the housing;

(E) an operating lever having one end adjacent to one side of the housing and connected to one of said axially outermost hub members to impart rotation thereto;

(F) means connecting the rear of the link to the hub member adjacent to said lever connected hub member, at an eccentric location such that the rear of the link is carried either forwardly or rearwardly of the hub axis during rotation of the link connected hub member in opposite directions;

(G) and cooperating drive means on the lever and link connected hub members for drivingly connecting the same with the lever in any one of a number of different angular positions of adjustment relative to the link connected hub member, said drive means depending upon maintainence of the hub members in said axially contiguous relation but being rendered ineffective to enable said angular adjustment of the lever without disturbing the link connected hub member or the eccentric connection of the link thereto, upon axial movement of the hub members out of their contiguous relation when said fastening element is loosened, and without removal of the hub from the housing.

3. Actuating means for shifting the valve spool of a hydraulic control valve endwise in opposite directions from a neutral or hold position of the valve spool, comprising:

(A) a housing providing a bracket for mounting the actuating means upon the body of a control valve, said housing having (1) a rear portion with bearing holes opening to opposite sides of the housing and disposed on a common horizontal axis extending transversely of the housing, (2) a tubular front portion extending substantially horizontally from its rear portion and terminating in a forwardly facing opening to receive an end portion of the valve spool of a control valve when the actuating means is in place on the body of the valve, (3) and means on the front extremity of the housing providing for attachment thereof to the body of a control valve;

(B) a hub extending across the interior of the housing and rotatably journalled in said bearing holes, said hub comprising a plurality of axially contiguous hub members that are movable axially and rotatively relative to one another;

(C) an operating lever connected to one of the axially outermost hub members, for imparting back and forth rotary motion to the hub;

(D) a link in the housing extending lengthwise toward said opening and having its forward end adapted for connection to an end of the valve spool of a control valve;

(E) means eccentrically connecting the rear of the link to that hub member which is adjacent to the lever connected hub member, at a location above the hub axis so that back and forth rotary movement of the link connected hub member moves the rear of the link forwardly and rearwardly of the hub axis and shifts the link lengthwise fore and aft out of a normal position of the link;

(F) a single bolt coaxially connecting said hub members and releasably holding them against motion out of axially contiguous relation;

(G) flange means on the axially outermost hub members overlying the opposite sides of the housing and held by the spacing action of the hub members in non-binding substantially loose engagement with the housing as long as the bolt maintains the hub members in axially contiguous relation, said flange means precluding axial displacement of the hub in either axial direction from said bearing holes and compelling disengagement of the bolt from one of said axially outermost hub members in order to release the same for detachment from one side of the housing and to release the remainder of the hub for removal from the opposite side of the housing;

(H) and cooperating drive means on the link and lever connected hub members for drivingly connecting the same with the lever in any one of a number of different angular positions of adjustment relative to the link connected hub member, said drive means depending upon maintainence of the hub members in said axially contiguous relation but being rendered ineffective to enable said angular adjustment of the lever without disturbing the link connected hub member or the eccentric connection of the link thereto, upon axial movement of the hub members out of contiguous relation when said bolt is loosened, and without removal of the hub from the housing.

References Cited in the file of this patent

UNITED STATES PATENTS

| | | |
|---|---|---|
| 594,109 | Weed et al. | Nov. 23, 1897 |
| 2,097,020 | Cornelius | Oct. 26, 1937 |
| 2,703,106 | Borgerd | Mar. 1, 1955 |
| 2,948,558 | Schultz | Aug. 9, 1960 |
| 2,960,199 | Morse | Nov. 15, 1960 |
| 2,980,453 | Nesson | Apr. 18, 1961 |
| 3,023,629 | Wagner | Mar. 6, 1962 |

FOREIGN PATENTS

| | | |
|---|---|---|
| 200,743 | Austria | Nov. 25, 1958 |